July 7, 1953
C. H. LUHRS ET AL
MICROWAVE POLARIZATION ROTATING
DEVICE AND COUPLING NETWORK
Filed March 24, 1949
2,644,930
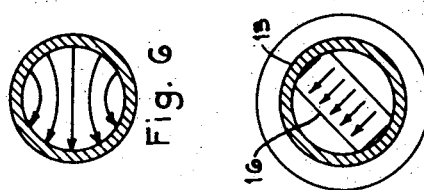
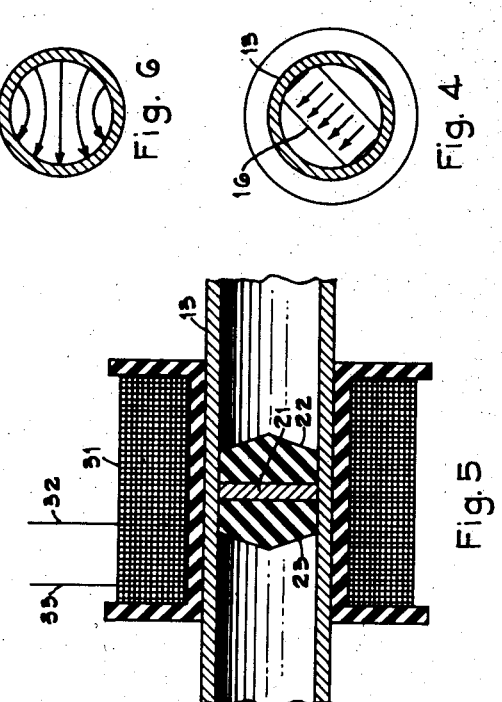
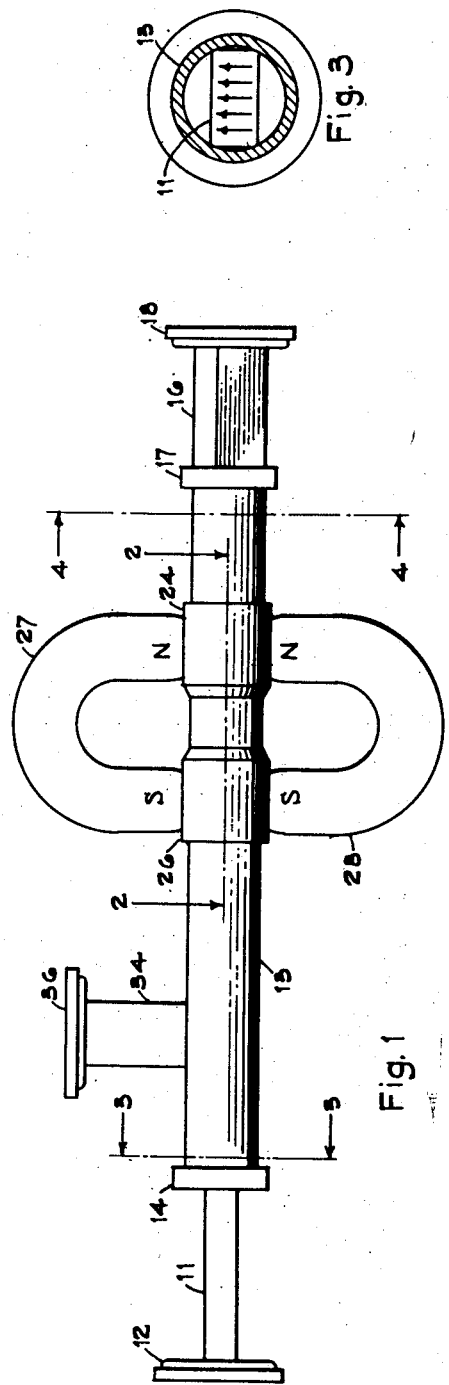
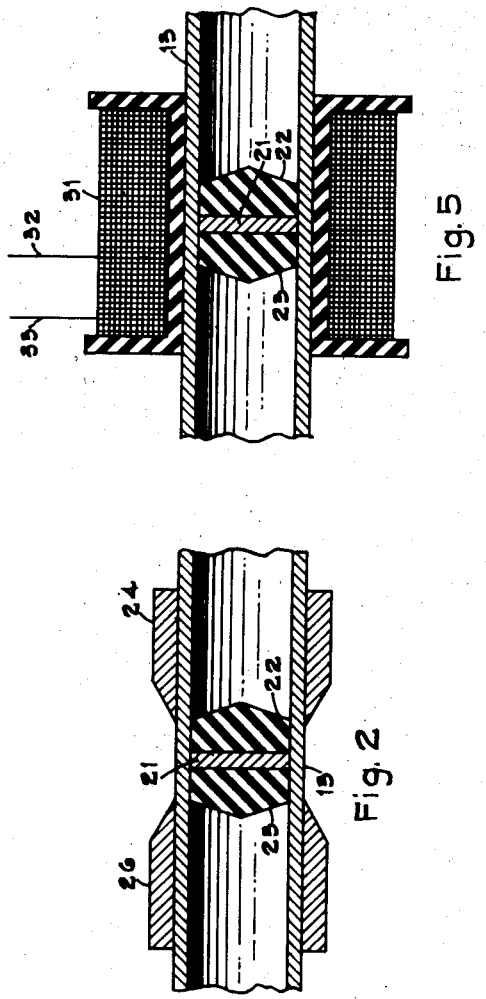
Inventor
CHARLES H. LUHRS
WILLIAM J. TULL
*H. J. Mackey*
Attorney Patented July 7, 1953

2,644,930

UNITED STATES PATENT OFFICE 2,644,930

MICROWAVE POLARIZATION ROTATING DEVICE AND COUPLING NETWORK

Charles H. Luhrs, Teaneck, N. J., and William J. Tull, Pleasantville, N. Y., assignors to General Precision Laboratory Incorporated, a corporation of New York Application March 24, 1949, Serial No. 83,225

12 Claims. (Cl. 333—98)

This invention relates to a microwave coupling device and has for its particular purpose the provision of a device such that microwave energy is freely transmitted in one direction but energy transmitted in the opposite direction is either dissipated and prohibited from reaching a terminal point or in the alternative transmitted to and through a branching network while at the same time being prohibited from transmission to the terminal or origin for energy transmitted in the first mentioned direction. Thus one of the purposes of the invention is to provide a coupling device which is unilateral in its direction of transmission or which may act as a duplexer. That is, energy may be transmitted from a generating source directly to an antenna for radiation thereby but energy received by the same antenna is prohibited from being transmitted to the generating source and instead is transmitted through a branching circuit to a suitable receiver.

In accomplishing the purpose of this invention use is made of a phenomenon discovered to obtain in the case of microwaves which if not identical to the Faraday effect as it relates to polarized light waves is at least akin thereto.

In 1845 Michael Faraday discovered that when plane polarized light was transmitted through a block of glass subjected to a strong magnetic field in the direction of propagation the plane of vibration of the light was rotated. Subsequent to Faraday's early discovery the same phenomenon was observed in many solids, liquids and gases, the direction or rotation always being in the same direction regardless of the direction of propagation of the energy. The amount of rotation is usually given by the formula $\theta = VHL$ where $\theta$ is the angle of rotation, H the magnetic field strength, L the length of the path through the affecting substance and V a constant for any particular substance known as the "Verdet constant."

This phenomenon, heretofore, considered to exist only as respects polarized light waves has been discovered to likewise exist in the case of microwave energy, at least if the effect is not identical with what is known as the "Faraday effect," it has been discovered that various substances when influenced by a magnetic field have the power to cause a circumferential rotation of the microwave energy which rotation is the same regardless of the direction of propagation of energy depending only on the direction of the magnetic field.

Various substances exhibit this effect to a greater or less degree insofar as microwave energy is concerned while other substances particularly applicable as regards the rotation of light waves yield no measurable amount of rotation of microwave energy. For example, nitrobenzene which exhibits considerable effect on polarized light waves produces no measurable rotation in the microwave region.

Those substances which do affect microwave energy to a considerable extent include polyirons and ferrites the latter having the general formula $RO \cdot Fe_2O_3$ in which R stands for a bivalent metal ion. These substances are particularly adapted for use in the present invention, those of special interest being the ferrites having a cubic crystal structure, namely those containing the bivalent ions of magnesium, zinc, copper, nickel, iron, cobalt, manganese and mixtures thereof.

The phenomenon of the "Faraday effect" or one akin thereto, as referred to above, is utilized in the present invention by providing a wave guide structure of such form that microwave energy introduced at one end and rotated by the application of a magnetic field is in the proper plane to be freely transmitted through the opposite end of the structure but the energy transmitted through the structure in the opposite direction and rotated by a similar amount in the same direction of rotation is in such a plane as to be incapable of transmission through the first mentioned end of the structure. The energy transmitted in the last stated direction is reflected before reaching the end of the structure and transmitted to a branch where it is either dissipated or used in other apparatus thus causing the device to act as a duplexer.

The exact nature of the invention will be more clearly understood from the following detailed description when taken in connection with the attached drawings in which:

Figure 1 is a view in elevation of a structure incorporating the principles of the invention.

Figure 2 is a sectional view taken on the line 2—2 of Figure 1.

Figure 3 is a sectional view taken on the line 3—3 of Figure 1 looking in the direction of the arrows.

Figure 4 is a sectional view taken on the line 4—4 of Figure 1 looking in the direction of the arrows.

Figure 5 is a sectional view similar to that of Fig. 2 but illustrating a modified arrangement for producing the requisite magnetic field.

Figure 6 is an illustration of a field pattern of microwave energy in one portion of the device.

For the purposes of the following description it will be assumed that it is desired to transmit microwave energy from left to right in the structure of Fig. 1 but to suppress transmission from right to left or to cause energy traveling in this direction to be transmitted to a branch circuit.

Microwave energy is impressed on a section of rectangular wave guide from any desired source such as a generator (not shown) which may be coupled to the wave guide fitting 12 in a manner as is well known in the art.

The rectangular wave guide 11 is joined to a circular wave guide section 13 and this junction may comprise a quarter wave transformer 14 as illustrated or may comprise a tapered junction or any of the other well recognized means for providing transition from rectangular to circular wave guide.

The opposite end of the circular wave guide 13 is connected to another section of rectangular wave guide 16, a suitable coupling device 17 being used to permit transition from circular to rectangular wave guide. A fitting 18 affixed to the end of the section 16 permits any desired apparatus to be connected thereto.

As indicated in the cross-sectional view of Figure 3 the rectangular wave guide section 11 is connected to the circular wave guide section 13 in such fashion that the longer faces of the rectangular guide are in a horizontal plane. On the other hand as indicated in the cross-sectional view of Fig. 4 the rectangular guide 16 is connected to the circular guide section 13 in such fashion that the longer faces are at an angle to the horizontal. Thus the plane of the rectangular wave guide 16 is rotated with respect to the plane of the rectangular wave guide 11 and in the example here illustrated the wave guide section 16 is rotated as respects the wave guide 11 in a counterclockwise direction by approximately 45 degrees.

Other amounts of rotation may be used, however, depending on the rotation given the polarization of the microwave energy which depends on a number of factors as will appear more fully hereafter.

For the present it is sufficient to note that in the structure as illustrated, if microwave energy is introduced in the rectangular section in the $TE_{1,0}$ mode and transmitted to the circular section 13 where it takes the $TE_{1,1}$ mode it must be rotated in this section by an angle of approximately 45 degrees in a counterclockwise direction in order to be transmitted through the rectangular wave guide section 16, again in the $TE_{1,0}$ mode.

This rotation of the microwave energy is accomplished by the apparatus most clearly disclosed in Fig. 2. A disk of material 21, which when a magnetic field is impressed thereon exhibits the property of rotating the plane of polarization of the microwave energy transmitted thereto, is inserted in the circular wave guide section 13 filling the bore thereof. The rotation of the plane of polarization of the microwave energy depending on the nature of the material of the disk 21, its thickness and the magnetic field impressed thereon constitutes the Faraday effect discussed above and if not identical thereto is at least so similar in it results as observable by tests as to be considered the equivalent thereof for the present purpose. Therefore, for the sake of brevity this phenomenon will hereinafter be referred to as the "Faraday effect" without qualification.

As heretofore stated various materials may be used to produce this effect, polyirons and ferrites and particularly ferrites having a cubic structure being especially useful. For example, a ferrite consisting of manganese oxide, zinc oxide and ferric oxide in the proportions of 25 mols of manganese oxide, 25 mols of zinc oxide and 50 mols of ferric oxide sintered at 1300° C., ground and the resultant mixture pressed in the form of a disk has been found to give excellent results. Such a material having a thickness of .051 inch when subjected to a magnetic field of 2000 gauss has the ability of rotating the plane of polarization of microwave energy having a frequency of 9500 megacycles by an angle of 45 degrees and hence for the purposes of explanation of the instant invention the disk 21 will be considered to be composed of such material having this thickness.

In order that multiple reflections of the microwave energy will not be produced by mismatch between the disk 21 and the circular wave guide 13 which would lead to a distribution of polarization of the microwave energy in the wave guide at the left of the disk 21, matching pieces 22 and 23 are positioned on either side of the disk 21. These pieces have a dielectric constant of the order of 190 in the case of the material used as an example herein, and the surfaces thereof which are directed away from the disk 21 are tapered to reduce reflections because of differences in impedance between the hollow wave guide and the material of the matching impedance in a manner as is well understood in the art.

The requisite magnetic field is provided in the form illustrated in Figs. 1 and 2 by encircling the wave guide 13 with a pair of pole pieces 24 and 26 positioned at each side of the disk 21. These pole pieces composed of steel or the like are provided with flattened faces against which the faces of a pair of U-shaped permanent magnets 27 and 28 abut. The magnets 27 and 28 are so located with respect to the pole pieces and each other that like poles engage the same pole piece and thus a magnetic field is created which extends through the disk 21 longitudinally of the axis of the wave guide 13.

The same effect may alternatively be produced by an electromagnetic structure as illustrated in Fig. 5 wherein a coil 31 energized from a source indicated by the conductors 32, 33 supplies the longitudinal magnetic field for the disk 21.

In either case a longitudinal magnetic field is impressed on the disk 21 which, if the disk is composed of the material and is of the thickness given in the above example, should be of the order of 2000 gauss.

Thus microwave energy which is introduced in the wave guide section 11 and which has a plane of polarization as indicated by the vectors in the cross sectional view of Fig. 3 has its plane of polarization rotated by an angle of 45 degrees in a counterclockwise direction as a result of the "Faraday effect" produced by the disk 21 having the magnetic field impressed thereon. Inasmuch as the wave guide 16 has its transverse axis rotated by the same amount in the same direction, the plane of polarization of the microwave energy impressed on this section as illustrated by the voltage vectors of Fig. 4 is such as to permit free transmission thereby and energy impressed at the end of the structure carrying the fitting 12 is freely transmitted therethrough, the only loss resulting by reason of such attenuation as is produced by the passage of the energy through the disk 21 and its associated matching pieces 22 and 23.

Consider now, however, the situation which obtains when microwave energy is impressed on the end of the structure carrying the fitting 18 to be transmitted in the reverse direction, namely, from right to left. This energy impressed on the rectangular wave guide 16 in the $TE_{1,0}$ mode has a plane of polarization as indicated by the voltage vectors of Fig. 4 and this plane of polarization is rotated in a counterclockwise direction by an angle of substantially 45 degrees as a result of the "Faraday effect" produced by the disk 21 and its associated magnetic field. Thus the energy existing in the left hand end of the circular wave guide 13 has a plane of polarization as indicated by the voltage vectors of Fig. 6 and this plane of polarization is such as to preclude transmission of such energy through the rectangular wave guide section 11. This energy is, therefore, reflected from the junction of the rectangular wave guide section 11 with the circular wave guide section 13 and in order that the reflected energy be abstracted from the structure thus far described the side arm or branch circuit 34 is provided.

This side arm is connected to the circular wave guide 13 with its long dimension extending longitudinally of the axis of the section 13 and extends in a direction at right angles to the wide face of the rectangular wave guide 11. The side arm 34 may also be provided with appropriate matching devices as is well understood in the art. Additionally the side arm is connected to the circular wave guide 13 at a point whose distance from the junction of the rectangular section 11 and the circular section 13 is substantially $$\frac{N\lambda_g}{4}$$

where N is any odd integer including 1 and $\lambda_g$ is the wave length of the microwave energy in the wave guide.

Thus the reflected energy is in the proper phase and plane of polarization to be transmitted into and through the side arm 34. The energy so transmitted may be dissipated in a dissipative load connected to the fitting 36 or a utilization circuit may be connected thereto.

For example, where it is desired to use the instant invention as a duplexer, a microwave generator may be connected to the fitting 12, an antenna to the fitting 18 and a receiver to the fitting 36. Under such circumstances energy produced by the generator will be transmitted directly to the antenna for radiation thereby, none being introduced into the side arm 34 because the plane of polarization is such as to bypass this connection. On the other hand energy received by the antenna cannot be impressed on the microwave generator because its plane of polarization is such as to be improper for transmission in the rectangular wave guide section 11. Instead this energy is reflected and since its plane of polarization is at an angle of 90 degrees as respects the generated energy it is in such a plane as to be freely transmitted through the side arm 34 and hence to the receiver.

Therefore, by use of such an arrangement energy may be transmitted and received by a single antenna while at the same time the generator and receiver are isolated from each other as far as the direct interchange of energy is concerned and no TR and ATR switches or other such devices need be employed.

What is claimed is:

1. A microwave coupling device comprising, a round wave guide section having a first rectangular wave guide section coupled to one end thereof and a second rectangular wave guide section coupled to the opposite end, the transverse axis of said second rectangular wave guide section being disposed at an angle to the transverse axis of said first rectangular wave guide section, a member disposed in said round wave guide section transversely to the axis thereof composed of finely divided material of the group comprising polyirons and ferrites pressed in the form of a disk and means for impressing a magnetic field on said disk member.

2. A microwave coupling device comprising, a round wave guide section having a first rectangular wave guide section coupled to one end thereof and a second rectangular wave guide section coupled to the opposite end, the transverse axis of said second rectangular wave guide section being disposed at an angle to the transverse axis of said first rectangular wave guide section, a member disposed in said round wave guide section transversely to the axis thereof composed of a finely divided material of the group comprising polyirons and ferrites pressed in the form of a disk, impedance matching members located adjacent the opposite surfaces of said disk member and means for impressing a magnetic field on said disk member.

3. A microwave coupling device comprising a round wave guide section having a first rectangular wave guide section coupled to one end thereof and a second rectangular wave guide section coupled to the opposite end, the transverse axis of said second rectangular wave guide section being disposed at an angle to the transverse axis of said first rectangular wave guide section, a member disposed in said round wave guide section transversely to the axis thereof composed of a finely divided material of the class of ferrites having a cubic crystal structure pressed in the form of a disk and means for impressing a magnetic field on said disk member.

4. A microwave coupling device comprising a round wave guide section having a first rectangular wave guide section coupled to one end thereof and a second rectangular wave guide section coupled to the opposite end, the transverse axis of said second rectangular wave guide section being disposed at an angle to the transverse axis of said first rectangular wave guide section, a member disposed in said round wave guide section transversely to the axis thereof composed of finely divided manganese oxide, zinc oxide and ferric oxide intimately mixed in substantially the proportions of 25 mols of manganese oxide, 25 mols of zinc oxide and 50 mols of ferric oxide and pressed in the form of a disk and means for impressing a magnetic field on said disk member.

5. A microwave coupling device comprising a round wave guide having a first rectangular wave guide section coupled to one end thereof and a second rectangular wave guide section coupled to the opposite end, the transverse axis of said second rectangular wave guide section being disposed at an angle to the transverse axis of said first rectangular wave guide section, a member disposed in said round wave guide section transversely to the axis thereof composed of finely divided manganese oxide, zinc oxide and ferric oxide intimately mixed in substantially the proportions of 25 mols of manganese oxide, 25 mols of zinc oxide and 50 mols of ferric oxide and pressed in the form of a disk, impedance matching members having high dielectric constants disposed adjacent the opposite surfaces of said disk member and means for impressing a magnetic field on said disk member.

6. A microwave coupling device comprising, a round wave guide section having a first rectangular wave guide section coupled to one end thereof and a second rectangular wave guide section coupled to the opposite end, the transverse axis of said second rectangular wave guide section being disposed at an angle to the transverse axis of said first rectangular wave guide section, a member disposed in said round wave guide section transversely to the axis thereof composed of finely divided material of the group comprising polyirons and ferrites pressed in the form of a disk, means for impressing a magnetic field on said disk member and a side arm wave guide section connected to said coupling device intermediate said first rectangular wave guide section and said disk member.

7. A microwave coupling device comprising a round wave guide section having a first rectangular wave guide section coupled to one end thereof and a second rectangular wave guide section coupled to the opposite end, the transverse axis of said second rectangular wave guide section being disposed at an angle to the transverse axis of said first rectangular wave guide section, a member disposed in said round wave guide section transversely to the axis thereof composed of a finely divided material of the class of ferrities having a cubic crystal structure pressed in the form of a disk, means for impressing a magnetic field on said disk member and a side arm wave guide section connected to said coupling device intermediate said first rectangular wave guide section and said disk member.

8. A microwave coupling device comprising a round wave guide section having a first rectangular wave guide section coupled to one end thereof and a second rectangular wave guide section coupled to the opposite end, the transverse axis of said second rectangular wave guide section being disposed at an angle to the transverse axis of said first rectangular wave guide section, a member disposed in said round wave guide section transversely to the axis thereof composed of finely divided manganese oxide, zinc oxide and ferric oxide intimately mixed in substantially the proportions of 25 mols of manganese oxide, 25 mols of zinc oxide and 50 mols of ferric oxide and pressed in the form of a disk, means for impressing a magnetic field on said disk member and a side arm wave guide section connected to said coupling device intermediate said first rectangular wave guide section and said disk member.

9. A microwave coupling device comprising, a round hollow open ended pipe wave guide transmission section adapted to be excited by microwave energy in a noncircular mode, a solid cylindrical member positioned therein and comprehending the axis of said wave guide section, said solid member being composed of finely divided material of the group comprising polyirons and ferrites pressed in intimate contact, and means for impressing a magnetic field on said solid member, said magnetic field extending through said solid member in a direction parallel to the axis thereof, whereby when said transmission section is excited in said noncircular mode, the plane of polarization of said energy is rotated.

10. A microwave coupling device comprising, a round hollow open ended pipe wave guide transmission section adapted to be excited by microwave energy in a noncircular mode, a solid cylindrical member positioned therein and comprehending the axis of said wave guide section, said solid member being composed of finely divided material of the class of ferrites having a cubic crystal structure pressed in intimate contact, and means for impressing a magnetic field on said solid member, said magnetic field extending through said solid member in a direction parallel to the axis thereof, whereby when said transmission section is excited in said noncircular mode, the plane of polarization of said energy is rotated.

11. A microwave coupling device comprising, a round hollow open ended pipe wave guide transmission section adapted to be excited by microwave energy in a noncircular mode, a solid cylindrical member positioned therein and comprehending the axis of said wave guide section, said solid member being composed of finely divided material having the formula $RO.Fe_2O_3$ where R is a bivalent metal ion pressed in intimate contact, and means for impressing a magnetic field on said solid member, said magnetic field extending through said solid member, in a direction parallel to the axis thereof, whereby when said transmission section is excited in said noncircular mode, the plane of polarization of said energy is rotated.

12. A microwave coupling device comprising, a round hollow open ended pipe wave guide transmission section adapted to be excited by microwave energy in a noncircular mode, a solid cylindrical member positioned therein and comprehending the axis of said wave guide section, said solid member being composed of a mixture of finely divided manganese oxide, zinc oxide and ferric oxide in substantially the proportions of 25 mols of manganese oxide, 25 mols of zinc oxide and 50 mols of ferric oxide, the particles of the mixture being pressed into intimate contact, and means for impressing a magnetic field on said solid member, said magnetic field extending through said solid member in a direction parallel to the axis thereof, whereby when said transmission section is excited in said noncircular mode, the plane of polarization of said energy is rotated.

CHARLES H. LUHRS.
WILLIAM J. TULL.

References Cited in the file of this patent

UNITED STATES PATENTS

| Number | Name | Date |
|---|---|---|
| 2,197,123 | King | Apr. 16, 1940 |
| 2,402,948 | Carlson | July 2, 1946 |
| 2,425,345 | Ring | Aug. 12, 1947 |
| 2,438,119 | Fox | Mar. 23, 1948 |
| 2,442,396 | Bubb | June 1, 1948 |
| 2,508,479 | Wheeler | May 23, 1950 |
| 2,532,157 | Evans | Nov. 28, 1950 |

OTHER REFERENCES

Ragan, Microwave Transmission Circuits, vol. 9, Radiation Laboratory Series, pp. 645–46 and 660.